United States Patent
Venkataraman et al.

(10) Patent No.: US 10,165,322 B2
(45) Date of Patent: Dec. 25, 2018

(54) METHODS AND SYSTEMS FOR CONTROLLING USER DEVICES

(71) Applicant: Rovi Guides, Inc., Santa Clara, CA (US)

(72) Inventors: Sashikumar Venkataraman, Andover, MA (US); Rakesh Barve, Bangalore (IN)

(73) Assignee: Rovi Guides, Inc., San Jose, CA (US)

(*) Notice: Subject to any disclaimer, the term of this patent is extended or adjusted under 35 U.S.C. 154(b) by 1080 days.

(21) Appl. No.: 14/502,235

(22) Filed: Sep. 30, 2014

(65) Prior Publication Data

US 2016/0094874 A1 Mar. 31, 2016

(51) Int. Cl.
| | |
|---|---|
| *G06F 3/00* | (2006.01) |
| *H04N 21/441* | (2011.01) |
| *H04N 21/442* | (2011.01) |
| *H04N 21/466* | (2011.01) |
| *H04N 21/482* | (2011.01) |
| *G06F 3/01* | (2006.01) |
| *H04N 21/4223* | (2011.01) |

(52) U.S. Cl.
CPC ........ *H04N 21/441* (2013.01); *G06F 3/017* (2013.01); *H04N 21/4223* (2013.01); *H04N 21/44218* (2013.01); *H04N 21/4667* (2013.01); *H04N 21/482* (2013.01)

(58) Field of Classification Search
CPC ......... G06F 3/017; G06F 3/011; G06F 3/016; G06F 3/0346; G06F 21/31; G06F 21/32; G06F 3/013; G06F 3/167; G06F 21/6218; G06F 21/35; G06F 21/74; G06F 21/79; G06F 3/04883; G06F 21/36; G06F 3/041

USPC .......................................................... 715/853
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,098,186 B1* | 8/2015 | Worley | G06F 3/0488 |
| 9,195,813 B2* | 11/2015 | Hrybyk | G06F 21/31 |
| 2002/0174430 A1 | 11/2002 | Ellis et al. | |
| 2003/0110499 A1 | 6/2003 | Knudson et al. | |

(Continued)

FOREIGN PATENT DOCUMENTS

| | | |
|---|---|---|
| EP | 2627098 A1 | 8/2013 |
| WO | WO-2013/100250 A1 | 7/2013 |

*Primary Examiner* — Di Xiao
(74) *Attorney, Agent, or Firm* — Haley Guiliano LLP

(57) ABSTRACT

Methods and systems are described herein for a media guidance application that authorizes a user device to receive commands from selected users and does not authorize the user device to accept commands from non-selected users. Moreover, the media guidance application may authorize the user device to accept commands from a first user based on how other users interact with the first user. For example, if the actions of other users indicate that the first user is the leader of the group of users (or should otherwise be the one controlling the user device), the media guidance application may authorize the user device to accept commands from the first user based on the actions.

20 Claims, 5 Drawing Sheets

(56) References Cited

U.S. PATENT DOCUMENTS

| | | |
|---|---|---|
| 2005/0251827 A1 | 11/2005 | Ellis et al. |
| 2009/0315740 A1 | 12/2009 | Hildreth et al. |
| 2010/0153885 A1 | 6/2010 | Yates |
| 2012/0115436 A1* | 5/2012 | Dai .................. H04W 48/06 455/410 |
| 2013/0014052 A1 | 1/2013 | Frey et al. |
| 2014/0359651 A1* | 12/2014 | Lee .................... G06F 3/017 725/25 |
| 2015/0181632 A1* | 6/2015 | Ur ..................... H04W 12/08 455/39 |
| 2015/0309698 A1* | 10/2015 | Senderek ......... G06F 3/04842 715/815 |

* cited by examiner

METHODS AND SYSTEMS FOR CONTROLLING USER DEVICES

BACKGROUND

Current systems allow a user to interact with devices in multiple ways. For example, some devices allow users to input commands via a keyboard, touchscreen, and/or even voice controls. While such devices improve the accessibility and functionality of the devices, these ever-increasing number and types of ways to input commands create difficulties, particularly in a group system, when a device should only react to inputs from a single user. For example, a device that receives inputs as voice commands may have difficulty in identifying and processing commands from only a single user if the single user is part of a group, in which other users also issue commands and/or normal conversations are erroneously interpreted as commands.

SUMMARY

Accordingly, methods and systems are described herein for a media guidance application that authorizes a user device to receive commands from selected users and does not authorize the user device to accept commands from non-selected users. Moreover, the media guidance application may authorize the user device to accept commands from a first user based on how other users interact with the first user. For example, if the actions of other users indicate that the first user is the leader of the group of users (or should otherwise be the one controlling the user device), the media guidance application may authorize the user device to accept commands from the first user based on the actions.

For example, a user device that is used to present media content during a presentation may be configured to receive voice commands from a presenter of the presentation. The user device may further be configured to ignore commands that are triggered by comments from the audience. The media guidance application may distinguish between the presenter and members of the audience based on gestures made by the audience. For example, if members of the audience are facing a particular direction (e.g., towards the user device), the media guidance application may determine that none of the members of the audience is the presenter, and therefore the user device should not be authorized to receive commands from any of them.

In another example, a media guidance application may simultaneously receive commands, to be performed on a target device, from numerous users (e.g., via devices associated with those users). The media guidance application may cause the target device to only perform operations based on commands that are received from authorized devices, in which an authorized device corresponds to a user that has the attention of other users. The media guidance application may then disregard (or cause the target user device to disregard) the remaining commands (e.g., commands received from unauthorized devices).

A benefit of the media guidance application disclosed herein is to reduce false-positive commands. For example, while commands such as motion and voice controls allow users enhanced ways of interacting with a user device, such commands may be difficult to perform in groups. For example, the user device may respond to the motions or voices of other users. By reacting only to commands issued from an authorized user, the media guidance application reduces the risk of false-positives.

In some aspects, the media guidance application identifies a first user and a second user within a viewing area of a user device. For example, the media guidance application (e.g., via control circuitry) may detect (e.g., via a detection module) one or more people within the range of a user device.

The media guidance application may detect (e.g., via a detection module) a first gesture performed by the first user. For example, the first gesture may indicate that the first user is paying attention to the second user. Alternatively or additionally, the first gesture may include a gaze point of the first user being fixated on the second user (e.g., the first user is looking at the second user).

The media guidance application may then cross-reference (e.g., via control circuitry) the first gesture with a database (e.g., stored in storage circuitry) listing gestures that indicate that user devices should accept commands to determine whether the first gesture indicates that the user device should accept a command from the second user. For example, the media guidance application may determine (e.g., via control circuitry) whether or not the detected gesture is listed as a gesture that indicates that the second user is a leader of the group (or should otherwise be in control of the user device).

The media guidance application may then authorize the user device to accept the command from the second user in response to determining that the first gesture indicates that the user device should accept the command from the second user. For example, the command may be a voice command issued by the second user which may cause the user device to present media content.

In some embodiments, the media guidance application may also not authorize the user device to accept the command from the second user in response to determining that the first gesture does not indicate that the user device should accept the command from the second user. For example, if the first gesture (e.g., body language of the first user) indicates that the second user should not be given control of the user device, then the media guidance application may not authorize the user device to receive commands from the second user.

In some embodiments, the media guidance application may not authorize the user device to accept the command (or a different command) from the first user in response to determining that the first gesture indicates that the user device should accept the command from the second user. For example, in response to determining that the second user should be authorized to control the user device, the media guidance application may exclude other users from controlling the user device.

In some embodiments, the media guidance application may detect a second gesture performed by the second user and cross-reference the second gesture with the database to determine whether the second gesture indicates that the user device should accept the command from the second user. For example, the media guidance application may determine that a user should be given authorization to control a user device based on the gestures of other users and/or the user's own gestures.

In some embodiments, the media guidance application may have additional requirements for granting authorization to control a user device. For example, the media guidance application may require a threshold number of gestures to be detected before granting access. In such cases, the media guidance application may detect gestures that indicate that the user device should accept the command from the second user from a number of users in the viewing area. The media guidance application may compare the number to a threshold number. The media guidance application may then not authorize the user device to accept the command from the second user in response to determining that the number does not exceed the threshold number.

In another example, the media guidance application may require a gesture to be performed for a particular length of time. In such cases, the media guidance application may determine a length of time of the first gesture. The media guidance application may compare the length of time of the first gesture to a threshold length of time. The media guidance application may then not cross-reference the first gesture with the database in response to determining that the length of time does not exceed the threshold length of time.

In yet another example, the media guidance application may require a particular frequency of gestures in order to grant authorization. In such cases, the media guidance application may determine a frequency of the first gesture. The media guidance application may then compare the frequency to a threshold frequency. The media guidance application may then not authorize the user device to accept the command from the second user in response to determining that the frequency does not exceed the threshold frequency.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
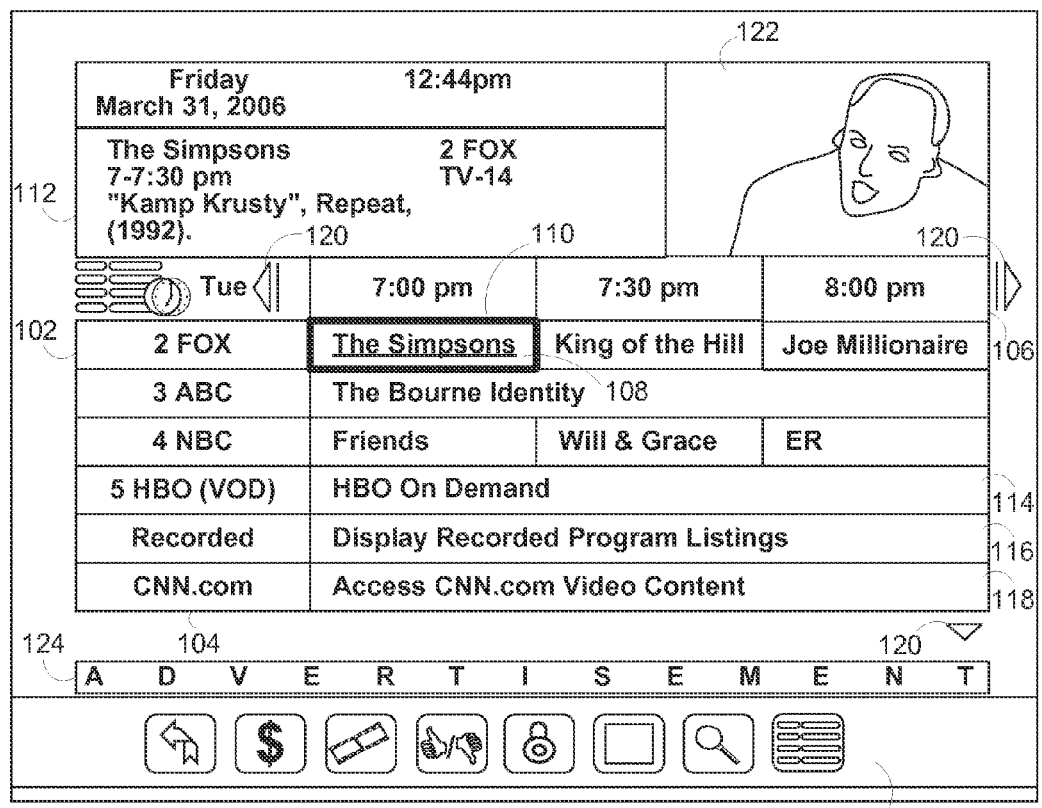
FIG. 1 shows an illustrative example of a display screen generated by a media guidance application in accordance with some embodiments of the disclosure.

Methods and systems are described herein for a media guidance application that authorizes a user device to receive commands from selected users and does not authorize the user device to accept commands from non-selected users. Moreover, the media guidance application may authorize the user device to accept commands from a first user based on how other users interact with the first user. For example, if the actions of other users indicate that the first user is the leader of the group of users (or should otherwise be the one controlling the user device), the media guidance application may authorize the user device to accept commands from the first user based on the actions.

As referred to herein, an "interactive media guidance application" or, sometimes, a "media guidance application" or a "guidance application" is an application that provides media guidance through an interface that allows users to efficiently navigate and/or access media content. Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory ("RAM"), etc.

For example, a media guidance application may be implemented on, or otherwise control, a user device that is used to present media content. For example, the user device could be used to present a presentation. Furthermore, the presentation of the media content may be controlled through user commands (e.g., motion and/or voice controls) issued from a presenter of the presentation. The media guidance application may distinguish between the presenter and members of the audience based on gestures made by the audience in order to prevent the detection of false-positive user commands (e.g., triggered based on audience member conversations).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactive content forms. Content may be recorded, played, displayed or accessed by user equipment devices, but can also be part of a live performance.

In some embodiments, the media guidance application identifies a first user and a second user within a viewing area of a user device. For example, the media guidance application (e.g., via control circuitry) may detect (e.g., via a detection module) one or more people within the range of a user device. As referred to herein, a "viewing area" is an area in which users consuming media on a display device are typically situated. A viewing area may be expressed in terms of particular structures (e.g., a room, house, etc.), may be defined as a distance (e.g., feet, meters, etc.) from a user device, or may be defined in terms of the accessibility of a media content (e.g., whether or not a user may connect to a router used to access the media content). Furthermore, the viewing area may be limited (or expanded) based on the location of objects that may affect the ability of a user to access a user device while in a viewing area (e.g., walls, doors, windows, etc.).

In some embodiments, the media guidance application may detect (e.g., via a detection module) a first gesture performed by the first user. For example, the first gesture may indicate that the first user is paying attention to the second user. Alternatively or additionally, the first gesture may include a gaze point of the first user being fixated on the second user (e.g., the first user is looking at the second user).

As referred to herein, a "gesture" includes any action, position, or movement of part of the body, including, but not limited to, a hand, mouth, or head, to express an idea or meaning. For example, a gesture may include a user looking in a particular direction, speaking in a particular direction, moving his/her body in a particular way (e.g., body language), etc. In some embodiments, gestures may also include words spoken by a particular user. For example, the media guidance application may detect that a first user made a statement that indicates that a second user should be granted authorization to control a user device. In yet another example, the body language or position of a first user (e.g., in a sitting position) relative to a second user (e.g., in a standing position) may indicate that the second user is the leader of the group or should otherwise be controlling the user device.

Additionally or alternatively, in some embodiments, other information such as the age and/or other demographic information and/or any visually and/or audibly distinguishable trait may indicate that a second user should be granted authorization to control a user device. For example, if a first user is older, dressed differently, has facial hair, and/or speaks in a lower voice tone (e.g., an adult teacher) than the other users (e.g., student youths), the media guidance application may grant authorization to control a user device to the first user.

In some embodiments, the media guidance application may cross-reference (e.g., via control circuitry) the first gesture with a database (e.g., stored in storage circuitry) listing gestures that indicate that user devices should accept commands to determine whether the first gesture indicates that the user device should accept a command from the second user. For example, the media guidance application may determine (e.g., via control circuitry) whether or not the detected gesture is listed as a gesture that indicates that the second user is a leader of the group (or should otherwise be in control of the user device).

In some embodiments, the gestures that indicate that a user device should grant authorization to a particular user may be determined by the media guidance application based on prior user history (e.g., of the current user and/or a group of users). Alternatively or additionally, the media guidance application may receive a set of gestures from a remote source. The gestures may be based on industry standards, consumer reviews, user trends, etc.

The media guidance application may then authorize the user device to accept the command from the second user in response to determining that the first gesture indicates that the user device should accept the command from the second user. For example, the command may be a voice command issued by the second user which may cause the user device to present media content.

As referred to herein, a "command" may include any order, instruction, and/or direction. For example, a command may relate to the presentation of media content by a user device. Alternatively or additionally, a command may relate to any media guidance application operation. As referred to herein, a "media guidance application operation" refers to any operation performed by a media guidance application. For example, a media guidance application operation may correspond to providing, receiving, and/or generating for display media assets and/or media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity).

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Still other operations of a media guidance application may include the control of devices. For example, a media guidance application operation may include turning a device on and off, raising the volume associated with a device, adjusting the display settings of a device, assigning parental controls, transferring information (e.g., messages) from one device to another, storing and/or recording content, entering authorization information and/or payment information, etc.

In some embodiments, a media guidance application operation may relate to a social media activity such as publicly distributing information associated with a user. For example, the media guidance application may retrieve a list of entities such as friends (e.g., a social network buddy list), contacts (e.g., retrieved from a phone/text message/e-mail account associated with the user), and/or public services (e.g., hospitals, police departments, schools, etc.) with known associations to the user or the community of the user and generate for display information (e.g., a post content) on a social network.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

In some embodiments, the media guidance application may also not authorize the user device to accept the command (or a different command) from the second user in response to determining that the first gesture does not indicate that the user device should accept the command from the second user. For example, if the first gesture (e.g., body language of the first user) indicates that the second user should not be given control of the user device, then the media guidance application may not authorize the user device to receive commands from the user. In such cases, commands issued by those users may be disregarded by the media guidance application.

In some embodiments, the media guidance application may not authorize the user device to accept the command from the first user in response to determining that the first gesture indicates that the user device should accept the command from the second user. For example, in response to determining that the second user should be authorized to control the user device, the media guidance application may exclude other users from controlling the user device.

In some embodiments, the media guidance application may detect a second gesture performed by the second user and cross-reference the second gesture with the database to determine whether the second gesture indicates that the user device should accept the command from the second user. For example, the media guidance application may determine that a user should be given authorization to control a user device based on the gestures of other users and/or the user's own gestures.

In some embodiments, the media guidance application may have additional requirements for granting authorization to control a user device. To determine whether or not the additional requirements are met, the media guidance application may reference various thresholds. As described herein, a "threshold" is a value that may be compared to another value (or a corresponding unit of measure) in order to determine whether or not a condition has been met and/or a function should be performed. For example, a number, length, or frequency of a gesture may be compared to a threshold number, length, or frequency in order to determine whether or not a user should be authorized to issue commands to a user device.

The particular values (e.g., expressed as either quantitative or qualitative terms) may be determined by the media guidance application based on prior user history (e.g., of the current user and/or a group of users). Alternatively or additionally, the media guidance application may receive a set of threshold values from a remote source. The values may be based on any criteria (e.g., industry standards, consumer reviews, user trends, etc.).

For example, the media guidance application may require a threshold number of gestures to be detected before granting access. In such cases, the media guidance application may detect gestures that indicate that the user device should accept the command from the second user from a number of users in the viewing area. The media guidance application may compare the number to a threshold number. The media guidance application may then not authorize the user device to accept the command from the second user in response to determining that the number does not exceed the threshold number.

In another example, the media guidance application may require a gesture to be performed for a particular length of time. In such cases, the media guidance application may determine a length of time of the first gesture. The media guidance application may compare the length of time of the first gesture to a threshold length of time. The media guidance application may then not cross-reference the first gesture with the database in response to determining that the length of time does not exceed the threshold length of time.

In yet another example, the media guidance application may require a particular frequency of gestures in order to grant authorization. In such cases, the media guidance application may determine a frequency of the first gesture. The media guidance application may then compare the frequency to a threshold frequency. The media guidance application may then not authorize the user device to accept the command from the second user in response to determining that the frequency does not exceed the threshold frequency.

In some embodiments, whether or not a user is authorized to issue commands to a particular user device or a set of user devices (either permanently or temporarily) may be stored in a user profile associated with the user. As referred to herein, a "user profile" is a collection of data associated with one or more people, groups of people, and/or other entity. For example, a user profile associated with a first user may include information related to the consumption of media content by the user as well as whether or not the first user is authorized to control a particular user device. Furthermore, the user profile may include more specific authorizations (e.g., based on one or more detected gestures). For example, the user profile may indicate what media content the user may access, when the user may control the user device, where a user may control a user device, how (e.g., on what devices, in what formats, what commands, etc.) a user may control a user device, etc.

To a mass the information about a user in the user profile, the media guidance application may monitor a user or users for one or more gestures, receive (directly or indirectly) information about the user, and/or consult third-party databases or information sources. For example, the media guidance application may monitor a user or users using a detection module incorporated into or accessible by the media guidance application to detect gestures that indicate a user should be authorized to control a user device.

In another example, the media guidance application may receive information directly from a user (e.g., manual submissions) in response to queries, questionnaires, calibrations, etc. Alternatively or additionally, the media guidance application may receive information indirectly from a user. For example, the media guidance application may receive credit card purchase information, online submissions of information, etc., from the respective sources of such information, which may be used to determine whether or not a user may control a user device.

In yet another example, the media guidance application may access databases of information (or other user profiles) associated with a user. For example, the media guidance application may query a central repository of consumer information and request information on the first user. Alternatively or additionally, the media guidance application may link to other user profiles and/or accounts (e.g., social networking accounts) associated with a user in order to compile information, which may be used to determine whether or not a user may control a user device.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 2:
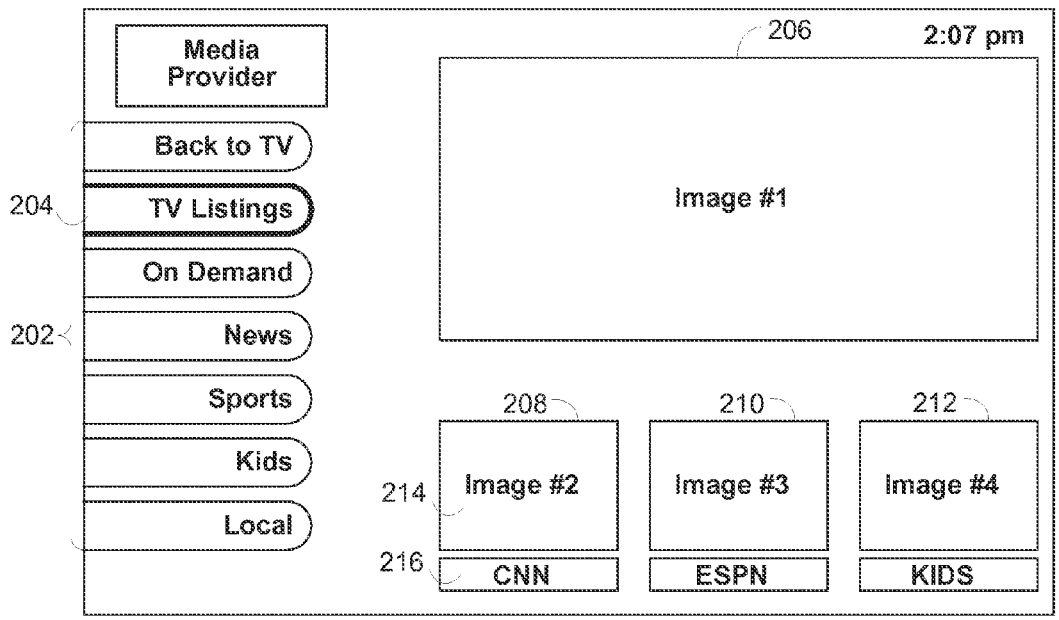
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
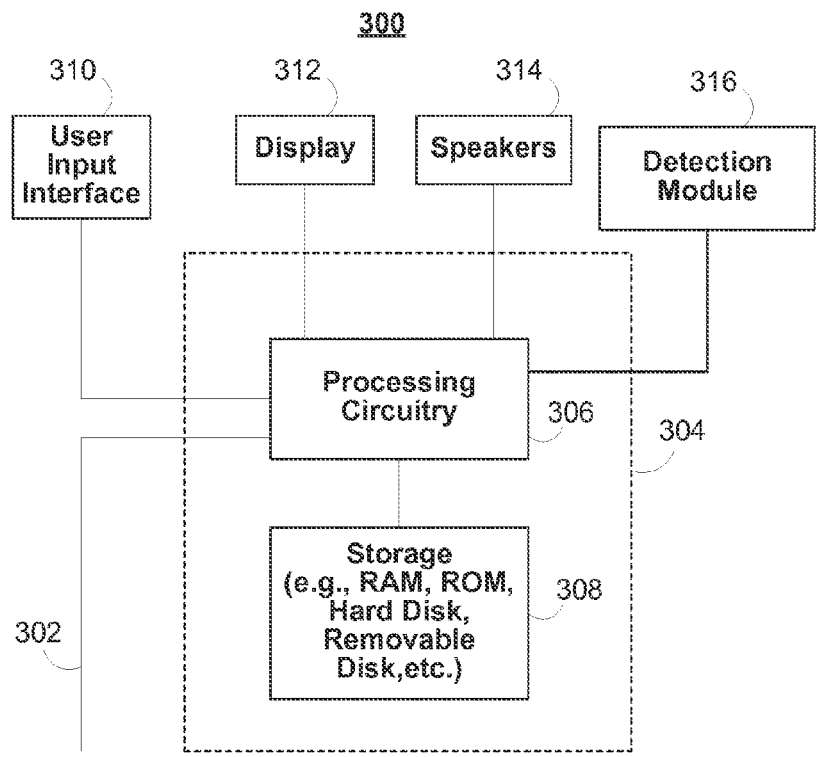
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300, also referred to as user device 300, may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user device 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user device 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, object recognition module, etc.). In some embodiments, detection module 316 may include components that are specialized to generate particular information (e.g., whether or not a user performed a gesture, how long a user performed a gesture, how many gestures a user or group of users performed, the frequency of gestures performed by a user or a group of users, etc.).

For example, as discussed below in relation to FIG. 5, detection module 316 may include an eye contact detection component, which determines or receives a location upon which one or both of a user's eyes are focused (e.g., in order to determine whether or not a first user is looking at a second user). The location upon which a user's eyes are focused is referred to herein as the user's "gaze point." In some embodiments, the eye contact detection component may monitor one or both eyes of a user of user device 300 to identify a gaze point of one or more users. The eye contact detection component may additionally or alternatively determine whether one or both eyes of the user are focused on a location (e.g., another user). In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, and may be a separate device or system in communication with user equipment device 300.

In some embodiments, detection module 316 may include a content recognition module. The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine whether or not a user performed a gesture, how long a user performed a gesture, how many gestures a user or group of users performed, the frequency of gestures performed by a user or a group of users, etc. For example, the media application may receive data in the form of a video of the user. The video may include a series of frames. For each frame of the video, the media application may use a content recognition module or algorithm to detect the people (e.g., the number of users in a viewing area) in each of the frames or series of frames and/or whether or not a gesture was performed by any of the users.

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the interaction of a user and/or the content of a media asset. For example, the media guidance application may determine whether or not a user is speaking and/or about what the user is speaking. For example, comments made by a first user may be analyzed to determine whether or not the comments indicate that a second user should be given control of a user device.

In addition, the media application may use multiple types of optical character recognition and/or fuzzy logic, for example, when processing keyword(s) retrieved from data (e.g., textual data, translated audio data, user inputs, etc.) describing one or more users or one or more gestures made by the one or more users. For example, if the particular data received is textual data (e.g., a sign, banner, poster, notation, and/or content appearing on a computer screen), using fuzzy logic, the media application (e.g., via a content recognition module or algorithm incorporated into, or accessible by, the media application) may determine two fields and/or values to be identical even though the substance of the data or value (e.g., two different spellings) is not identical. For example, if a name identified on a banner in the viewing area corresponds to the name of a user (e.g., retrieved from a user profile) in the viewing area, the appearance of the name may indicate that the user should be given control of the user device.

It should be noted that detection module 316 may, in some embodiments, be located on a separate device in communication with the device upon which a media guidance application (and control circuitry 304) is implemented. For example, in some embodiments, detection module 316 may communicate with user device 300 via a communications network (e.g., communications network 414 (FIG. 4)).

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user equipment device 300. This way, the processing of the instructions is performed remotely by the server while the resulting displays are provided locally on user equipment device 300. User equipment device 300 may receive inputs from the user via input interface 310 and transmit those inputs to the remote server for processing and generating the corresponding displays. For example, user equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to user equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
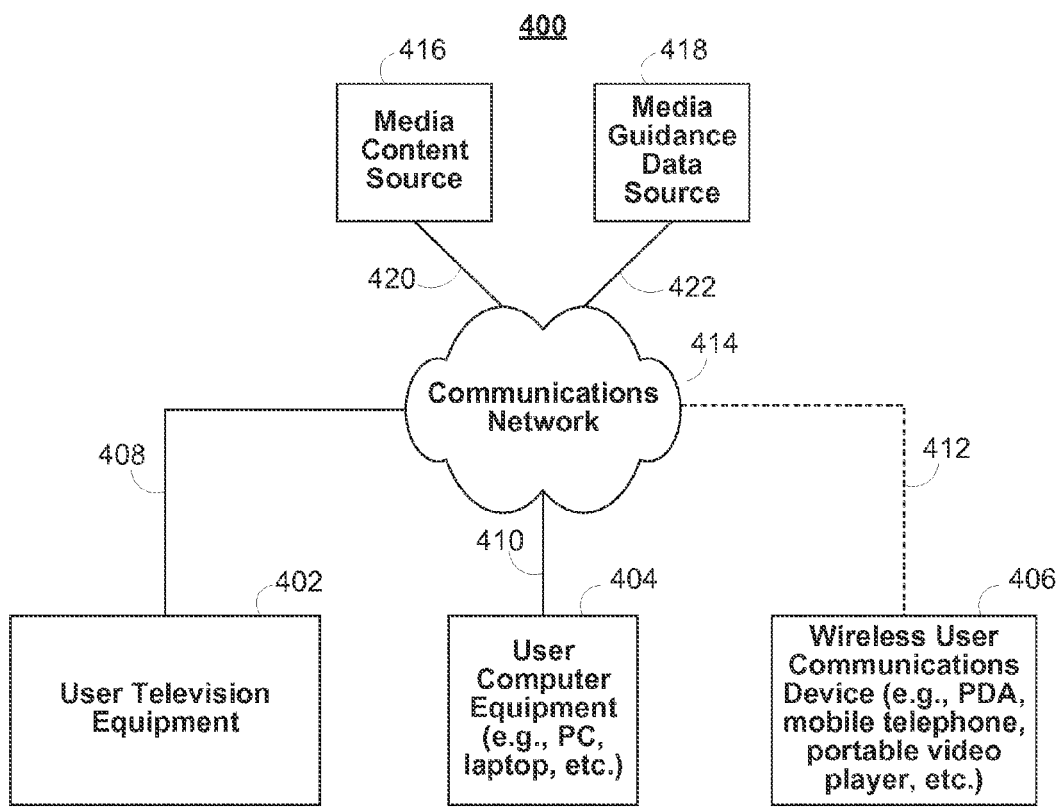
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates the likelihood that a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
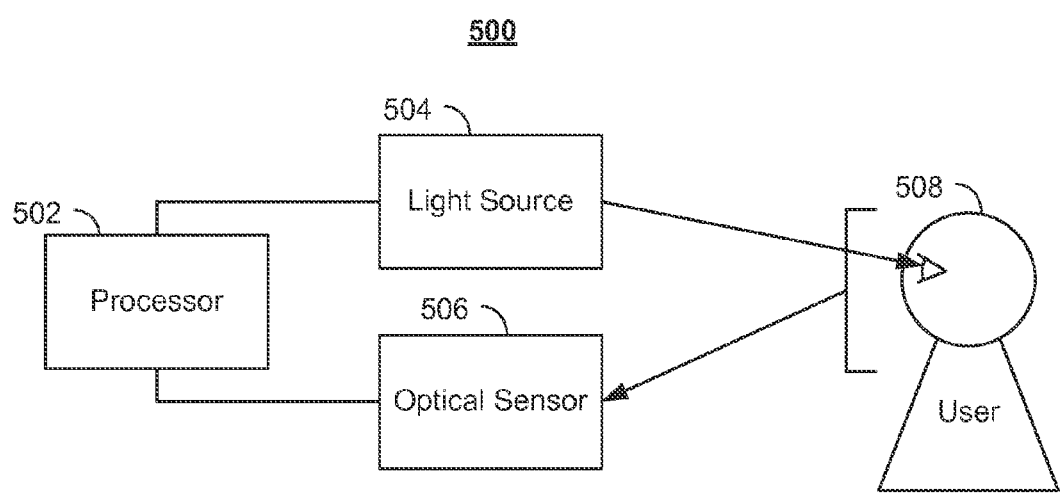
FIG. 5 shows an illustrative example of a detection module used to monitor gestures of a user in accordance with some embodiments of the disclosure.

FIG. 5 is an illustrative example of one component of a detection module (e.g., detection module 316 (FIG. 3)), which may be accessed by a media guidance application in accordance with some embodiments of the disclosure. FIG. 5 shows eye contact detection component 500, which may be used to identify the gaze point of a user of user device 300, in order to determine whether or not a user is making a gesture (e.g., looking at another user) that indicates another user should be authorized to command a user device. For example, the location upon which a user's eyes are focused may indicate whether or not a user is paying (or the amount a user is paying) attention to another user. For example, eye contact detection component 500 may determine whether one or both eyes of a first user are focused on a second user (e.g., indicating that the first user is attentive to the second user) or focused on a location that is not the second user (e.g., indicating that a user is not attentive to the second user).

Eye contact detection component 500 includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's gaze point.

In some embodiments, eye contact detection component 500 is configured for determining a gaze point of a single user. In other embodiments, eye contact detection component 500 may determine gaze points for a plurality of users. Eye contact detection component 500 may identify multiple users of user devices (e.g., user equipment device 300 (FIG. 3)).

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into a user device (e.g., user equipment device 300 (FIG. 3)).

Processor 502 may be similar to processing circuitry 306 (FIG. 3) described above. In some embodiments, processor 502 may be processing circuitry 306 (FIG. 3), with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e., a first Purkinje image), the reflection from the inner surface of the cornea (i.e., a second Purkinje image), the reflection from the outer (anterior) surface of the lens (i.e., a third Purkinje image), and/or the reflection from the inner (posterior) surface of the lens (i.e., a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e., corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point. Processor 502 may also store or obtain information describing the location of one or more light sources 504 and/or the location of one or more optical sensors 506 relative to a display (e.g., display 312 (FIG. 3)). Using this information, processor 502 may determine a user's gaze point on a display (e.g., display 312 (FIG. 3)), or processor 502 may determine whether or not a user's gaze point is fixated on another user.

In some embodiments, eye contact detection component 500 performs best if the position of a user's head is fixed or relatively stable. In other embodiments, eye contact detection component 500 is configured to account for a user's head movement, which allows the user a more natural viewing experience than if the user's head were fixed in a particular position.

In some embodiments accounting for a user's head movement, eye contact detection component 500 includes two or more optical sensors 506. For example, two cameras may be arranged to form a stereo vision system for obtaining a 3D position of the user's eye or eyes; this allows processor 502 to compensate for head movement when determining the user's gaze point. The two or more optical sensors 506 may be part of a single unit or may be separate units. For example, a user device (e.g., user equipment device 300 (FIG. 3)) may include two cameras used as optical sensors 506, or eye contact detection component 500 in communication with the user device (e.g., user equipment device 300 (FIG. 3)) may include two optical sensors 506. In other embodiments, each of the user device (e.g., user equipment device 300 (FIG. 3)) and eye contact detection component 500 may include an optical sensor, and processor 502 receives image data from the optical sensor of the user device and the optical sensor of eye contact detection component 500. Processor 502 may receive data identifying the location of optical sensor 506 relative to a user and/or relative to each other and use this information when determining the gaze point.

In other embodiments accounting for a user's head movement, eye contact detection component 500 includes two or more light sources for generating multiple glints. For example, two light sources 504 may create glints at different locations of an eye. Using information on the two glints allows the media guidance application to determine a 3D position of the user's eye or eyes, allowing processor 502 to compensate for head movement. Processor 502 may also receive data identifying the location of light sources 504 relative to a display (e.g., display 312 (FIG. 3)) and/or relative to each other and use this information when determining the gaze point.

In some embodiments, other types of eye contact detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 500.

It should be noted that eye contact detection component 500 is but one type of component that may be incorporated into or accessible by detection module 316 (FIG. 3) or the media application. Other types of components, which may generate other types of data (e.g., video, audio, textual, etc.), are fully within the bounds of this disclosure.

Figure 6:
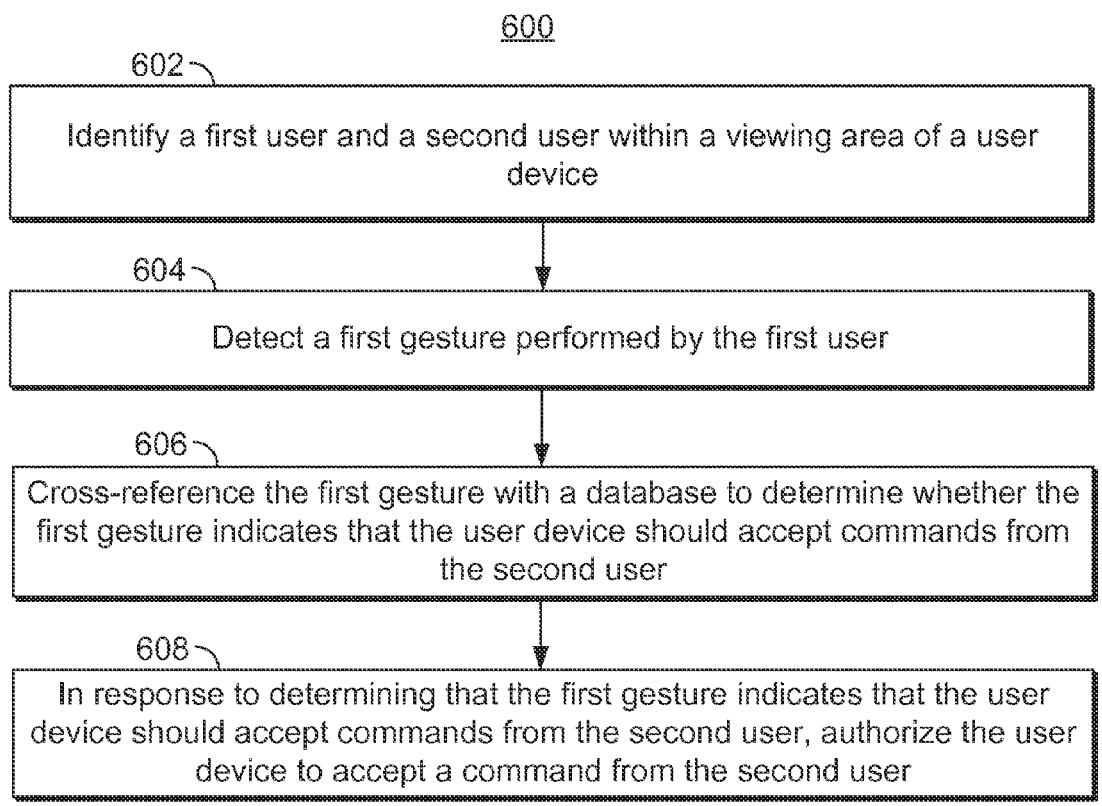
FIG. 6 is a flowchart of illustrative steps for determining whether or not to authorize a user device to accept commands from a user in accordance with some embodiments of the disclosure.

FIG. 6 is a flowchart of illustrative steps for determining whether or not to authorize a user device to accept commands from a user. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to determine whether or not to authorize a user device to accept commands from a user. In addition, one or more steps of process 600 may be incorporated into or combined with one or more steps of any other process or embodiment (e.g., process 700 (FIG. 7)).

At step 602, the media guidance application identifies (e.g., via control circuitry 304 (FIG. 3)) a first user and a second user within a viewing area of a user device (e.g., user equipment 402, 404, and/or 406 (FIG. 4)). For example, the media guidance application (e.g., via control circuitry 304 (FIG. 3)) may detect (e.g., via a detection module 316 (FIG. 3)) one or more people within the range of a user device.

In some embodiments, upon detecting each user in the viewing area, the media guidance application may retrieve (e.g., from storage 308 (FIG. 3) and/or any location accessible via communications network 414 (FIG. 4)) a user profile for each identified user. The user profile may include information about the user (e.g., a name of the user), current or previous user devices that a user is authorized to issue commands to, previous gestures that have been made by the user, calibrations or settings related the user that indicate when particular gestures are made by the user, etc. Additionally or alternatively, the user profile may include biometric information such as a voiceprint (e.g., for use in verifying whether or not a voice command originates from a particular user).

At step 604, the media guidance application detects (e.g., via detection module 316 (FIG. 3)) a first gesture performed by the first user. For example, the media guidance application may monitor (e.g., via detection module 316 (FIG. 3)) each user within the viewing area for gestures performed by that user. For example, the first gesture may indicate that the first user is paying attention to the second user. In another example, the first gesture may include a gaze point of the first user being fixated on the second user (e.g., the first user is looking at the second user). In another example, the first gesture may include words spoken towards or spoken about a second user that indicate the second user is a leader of the group or should otherwise be controlling the user device. In yet another example, the body language or position of a first user (e.g., in a sitting position) relative to a second user (e.g., in a standing position) may indicate that the second user is the leader of the group or should otherwise be controlling the user device.

At step 606, the media guidance application cross-references (e.g., via control circuitry 304 (FIG. 3)) the first gesture with a database (e.g., located at storage 308 (FIG. 3) and/or any location accessible via communications network 414 (FIG. 4)) listing gestures that indicate that user devices (e.g., user equipment 402, 404, and/or 406 (FIG. 4)) should accept commands to determine whether the first gesture indicates that the user device should accept a command from the second user. For example, the media guidance application may determine (e.g., via control circuitry 304 (FIG. 3)) whether or not the detected gesture is listed as a gesture that indicates that the second user is a leader of the group (or should otherwise be in control of the user device).

At step 608, the media guidance application authorizes (e.g., via control circuitry 304 (FIG. 3)) the user device to accept the command from the second user in response to determining (e.g., via control circuitry 304 (FIG. 3)) that the first gesture indicates that the user device should accept the command from the second user. For example, the command may be a voice command issued by the second user which may cause the user device to present media content.

For example, in response to determining (e.g., via control circuitry 304 (FIG. 3)) that a particular user should be granted authorization to issue commands to the user device, the media guidance application may update a user profile (e.g., located at storage 308 (FIG. 3) and/or any location accessible via communications network 414 (FIG. 4)). Furthermore, the media guidance application may retrieve identification information (e.g., a voiceprint or other data used to identify a user). When a voice command is received, the media guidance application may compare (e.g., via control circuitry 304 (FIG. 3)) data associated with the command (e.g., a voiceprint of the command) to the data (e.g., voiceprint) of all users that have been granted authorization to issue commands to the user device. In response to determining (e.g., via control circuitry 304 (FIG. 3)) a match, the media guidance application may allow the user device to receive the command. In another example, when a motion-control command is received, the media guidance application may compare (e.g., via control circuitry 304 (FIG. 3)) data associated with the command (e.g., an image of the user issuing the command) to the data (e.g., image) of all users that have been granted authorization to issue commands to the user device. In response to determining (e.g., via control circuitry 304 (FIG. 3)) a match, the media guidance application may allow the user device to receive the command.

In some embodiments, the media guidance application may also not authorize the user device to accept the command from the second user in response to determining that the first gesture does not indicate that the user device should accept the command from the second user. For example, if the first gesture (e.g., body language of the first user) indicates that the second user should not be given control of the user device, then the media guidance application may not authorize the user device to receive commands from the second user.

In some embodiments, the media guidance application may not authorize (e.g., via control circuitry 304 (FIG. 3)) the user device to accept the command from the first user in response to determining that the first gesture indicates that the user device should accept the command from the second user. For example, in response to determining that the second user should be authorized to control the user device, the media guidance application may exclude (e.g., via control circuitry 304 (FIG. 3)) other users from controlling the user device. For example, if a presenter is granted authorization to control a user device (e.g., a movie projector), the media guidance application may prevent other users (e.g., members of the audience) from issuing commands to the user device.

In some embodiments, the media guidance application may detect (e.g., via control circuitry 304 (FIG. 3)) a second gesture performed by the second user and cross-reference the second gesture with the database to determine whether the second gesture indicates that the user device should accept the command from the second user. For example, the media guidance application may determine (e.g., via control circuitry 304 (FIG. 3)) that a user should be given authorization to control a user device based on the gestures of other users and/or the user's own gestures. For example, the media guidance application may detect that a particular user is the predominate speaker in the viewing area. The media guidance application may then determine (e.g., via control circuitry 304 (FIG. 3)) whether being the predominate speaker in the viewing area indicates that the user should control the user device. If so, the media guidance application grants (e.g., via control circuitry 304 (FIG. 3)) the user device authorization to receive commands from the particular user.

For example, a first, second, and third user may all be in a single viewing area. Each of the three users may also be simultaneously speaking. The media guidance application may interpret the speaking of each user (correctly or in error) to correspond to three different verbal commands. For example, the media guidance application may determine the first user has requested to pause the media content. The media guidance application may determine the second user has requested to fast-forward the media content, and the media guidance application may determine the third user has requested to present different media content.

Although the media guidance application has recognized each of the verbal commands coming from each of the user. The media guidance application may not direct a user device to respond to one or more of the commands. For example, the media guidance application may first determine which (if any) of the first, second, and/or third users are authorized to control the user device. For example, if the media guidance application determines that the first and third users are not authorized to control the user device (e.g., the first and third users are not a group leader and/or otherwise a person in charge of controlling the user device), the media guidance application may disregard the verbal commands issued from them.

In contrast, if the media guidance application determines that the second user is authorized to control the user device (e.g., the second user is a group leader and/or otherwise a person in charge of controlling the user device), the media guidance application may allow the user device to execute the verbal commands issued the second user. For example, the media guidance application may identify all of the commands from all users in a viewing area, but select to perform only the commands corresponding to a user that the other two users are looking at (or for which the gestures of the users indicate should be selected).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 6.

Figure 7:
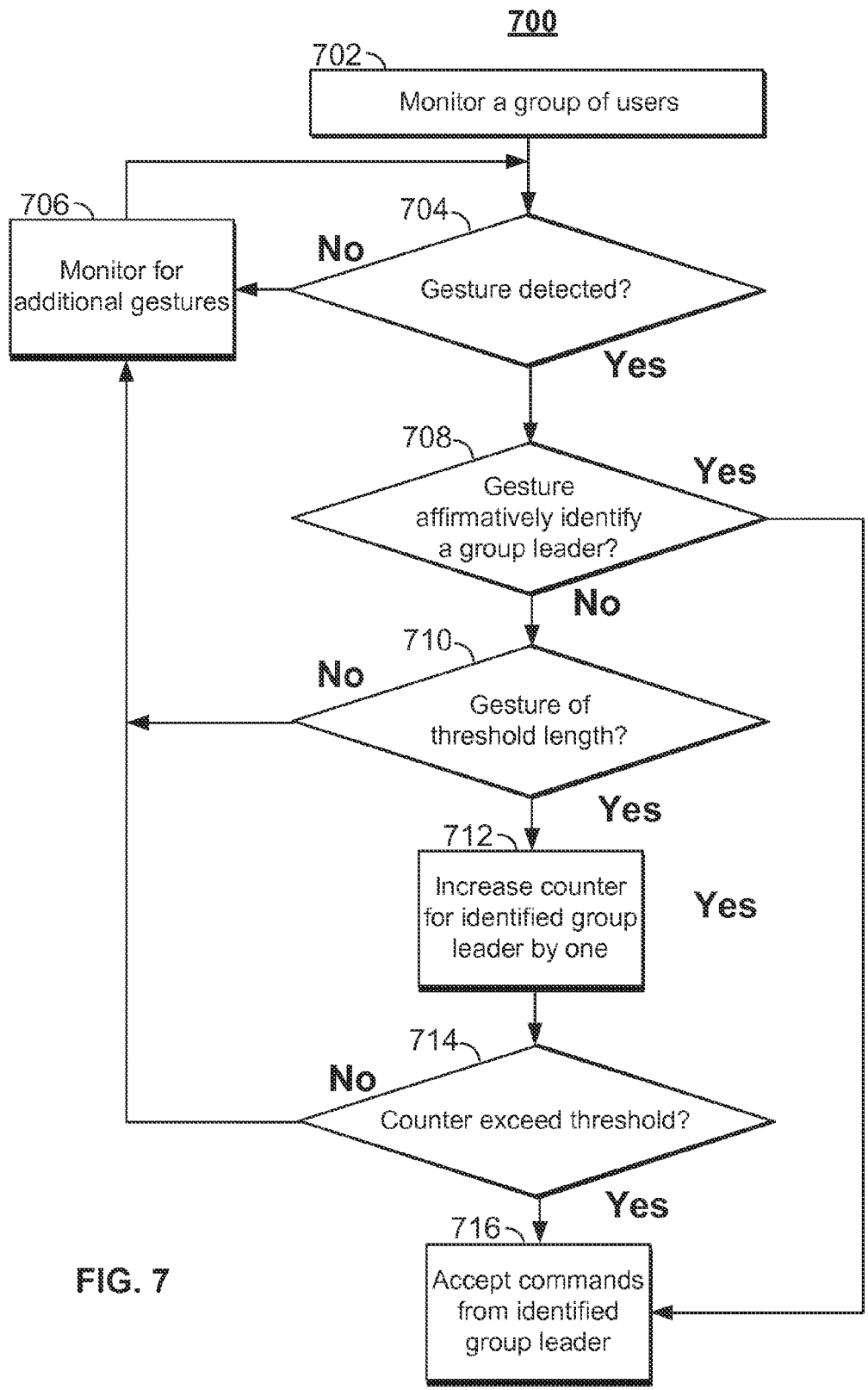
FIG. 7 is a flowchart of illustrative steps for determining whether or not to authorize a user device to accept commands from a user in accordance with some embodiments of the disclosure.

FIG. 7 is a flowchart of illustrative steps for determining whether or not to authorize a user device to accept commands from a user based on various thresholds. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to determine whether or not to authorize a user device to accept commands from a user. In addition, one or more steps of process 700 may be incorporated into or combined with one or more steps of any other process or embodiment (e.g., process 600 (FIG. 6)). For example, process 700 may represent some embodiments in which the number of gestures, the length of gestures, and/or the frequency of gestures are used to determine whether or not a user is authorized to issue command to a user device.

At step 702, the media guidance application monitors (e.g., via detection module 316 (FIG. 3)) a group of users. For example, as discussed in relation to step 602 (FIG. 6), the media guidance application may identify (e.g., via control circuitry 304 (FIG. 3)) a first user and a second user within a viewing area of a user device (e.g., user equipment 402, 404, and/or 406 (FIG. 4)).

At step 704, the media guidance application determines (e.g., via control circuitry 304 (FIG. 3)) whether or not a gesture was detected. In some embodiments, the media guidance applications may continuously compare actions (or the lack thereof) of a user to a database (e.g., located at storage 308 (FIG. 3) and/or any location accessible via communications network 414 (FIG. 4)) listing what actions (or lack thereof) constitute a gesture. If a gesture was detected (e.g., via control circuitry 304 (FIG. 3)), the media guidance application proceeds to step 708. If a gesture is not detected the media guidance application proceeds to step 706.

At step 706, the media guidance application monitors (e.g., via detection module 316 (FIG. 3)) for additional gestures. In some embodiments, the media guidance application may make a series of iterations and/or multiple simultaneous iterations through step 706 in order to determine whether or not any one of the users in the group is making a gesture. If the media guidance application determines (e.g., via control circuitry 304 (FIG. 3)) that a gesture has been made, the media guidance application returns to step 704.

At step 708, the media guidance application determines (e.g., via control circuitry 304 (FIG. 3)) whether or not the gesture affirmatively identifies a group leader (i.e., a user authorized to issue commands to the user device). For example, the media guidance application may detect (e.g., via detection module 316 (FIG. 3)) numerous gestures. Furthermore, the media guidance application may deal with different gestures differently. For example, various gestures may be associated with different weights with regard to whether or not the gesture affirmatively identifies a group leader.

For example, some gestures may correspond (e.g., based on a cross-reference with a database listing various weights for known gestures) to a high probability of determining a group leader. For example, if the media guidance application detects (e.g., via detection module 316 (FIG. 3)) spoken words that identify a leader, the media guidance application may affirmatively determine the leader based on such a gesture. In contrast, some gestures may correspond (e.g., based on a cross-reference with a database listing various weights for known gestures) to a low probability of determining a group leader. For example, if the media guidance application detects (e.g., via detection module 316 (FIG. 3)) a first user look at a second user, the media guidance application may not affirmatively determine the leader based on such a gesture.

For example, when determining (e.g., via control circuitry 304 (FIG. 3)) whether or not a detected gesture identifies a group leader, the media guidance applications may weigh different gestures differently. If a single gesture is weighted highly enough to affirmatively identify a group leader, the media guidance application proceeds to step 716. However, if a single gestures is not weighted highly enough to affirmatively identify a group leader, the media guidance application proceeds to step 710.

At step 710, the media guidance application determines (e.g., via control circuitry 304 (FIG. 3)) whether or not the gesture is of a threshold length. For example, in order to reduce false positives, the media guidance application may require that a gesture be of a threshold length. In some embodiments, the threshold length may depend on a type of gesture. For example, a gesture corresponding to a user standing (or sitting) may have a different threshold length than a gesture corresponding to a first user looking at a second user.

In some embodiments, the media guidance application may determine (e.g., via control circuitry 304 (FIG. 3)) a type of gesture. The media guidance application may then cross-reference the determined type of gesture with a database (e.g., located at storage 308 (FIG. 3) and/or communications network 414 (FIG. 4)) listing threshold lengths for different types of gestures. The database may then output a threshold length corresponding to the detected gesture.

For example, if the media guidance application requires a gesture to be performed for a particular length of time, the media guidance application may determine (e.g., via control circuitry 304 (FIG. 3)) a length of time of the gesture. The media guidance application may then compare (e.g., via control circuitry 304 (FIG. 3)) the length of time of the gesture to a threshold length of time. The media guidance application may then determine (e.g., via control circuitry 304 (FIG. 3)) whether or not the gesture indicates a user should be granted authorization to issue commands to the user device based on the comparison.

If the media guidance application determines (e.g., via control circuitry 304 (FIG. 3)) that the gesture is not of a threshold length, the media guidance application proceeds to step 706 and monitors for additional gestures. If the media guidance application determines (e.g., via control circuitry 304 (FIG. 3)) that the gesture is of a threshold length, the media guidance application proceeds to step 712.

At step 712, the media guidance application increases (e.g., via control circuitry 304 (FIG. 3)) a counter e.g., located at storage 308 (FIG. 3) and/or any location accessible via communications network 414 (FIG. 4)) for the group leader identified by the gesture by one and proceeds to step 714. At step 714, the media guidance application determines (e.g., via control circuitry 304 (FIG. 3)) whether or not the counter exceeds a threshold. For example, in some embodiments, the media guidance application may require a particular gesture aimed at a particular user to be done a threshold number of times (either by a single user or split between multiple users).

For example, if the media guidance application requires a gesture to be performed a particular number of times, the media guidance application may determine (e.g., via control circuitry 304 (FIG. 3)) the number of times of that the gesture has been performed (e.g., based on the counter). The media guidance application may then compare (e.g., via control circuitry 304 (FIG. 3)) the number of times to a threshold number. The media guidance application may then determine (e.g., via control circuitry 304 (FIG. 3)) whether or not the gesture indicates a user should be granted authorization to issue commands to the user device based on the comparison.

If the media guidance application determines (e.g., via control circuitry 304 (FIG. 3)) that the counter does not exceed the threshold, the media guidance application returns to step 706 and monitors for additional gestures. If the media guidance application determines (e.g., via control circuitry 304 (FIG. 3)) that the counter does exceed the threshold, the media guidance application proceeds to step 716.

At step 716, the media guidance application accepts commands from the identified group leader. In some embodiments, the media guidance application may continuously or periodically perform process 700. Furthermore, in some embodiments, the counter may be reset after a particular amount of time. For example, the media guidance application may require that gestures occur at a particular frequency. For example, if the media guidance application requires that a user speak ten words every minute to obtain or maintain group leader status, the media guidance application may reset the counter (e.g., counting words spoken by the user) every minute. Alternatively or additionally, media guidance application may require an average frequency, and the counter may record a series of minute increments and then average the increments.

For example, if the media guidance application requires a gesture to be performed with a particular frequency, the media guidance application may determine (e.g., via control circuitry 304 (FIG. 3)) the frequency with which the gesture has been performed (e.g., based on the counter). The media guidance application may then compare (e.g., via control circuitry 304 (FIG. 3)) the frequency to a threshold frequency. The media guidance application may then determine (e.g., via control circuitry 304 (FIG. 3)) whether or not the gesture indicates a user should be granted authorization to issue commands to the user device based on the comparison.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for controlling user devices, the method comprising:
    identifying a first user and a second user within a viewing area of a user device;
    detecting a first gesture performed by the first user;
    cross-referencing the first gesture with a database listing gestures that indicate that user devices should accept commands to determine whether the first gesture indicates that the user device should accept a command from the second user, wherein the cross-referencing comprises:
        retrieving a weight associated with the first gesture;
        determining whether the weight associated with the first gesture exceeds a value;
        in response to determining that the weight associated with the first gesture exceeds the value, determining that the first gesture indicates that the user device should accept the command from the second user; and
        in response to determining that the weight associated with the first gesture does not exceed the value, determining whether the first gesture satisfies another criterion that indicates the user device should accept the command from the second user; and
    in response to determining that the first gesture indicates that the user device should accept the command from the second user, authorizing the user device to accept the command from the second user.

2. The method of claim 1, further comprising not authorizing the user device to accept the command from the second user in response to determining that the first gesture does not indicate that the user device should accept the command from the second user.

3. The method of claim 1, further comprising not authorizing the user device to accept a different command from the first user in response to determining that the first gesture indicates that the user device should accept the command from the second user.

4. The method of claim 1, wherein determining whether the first gesture indicates that the user device should accept the command from the second user further comprises determining whether the first gesture indicates that the first user is paying attention to the second user.

5. The method of claim 1, wherein the first gesture includes a gaze point of the first user being fixated on the second user.

6. The method of claim 1, further comprising:
    detecting a second gesture performed by the second user; and cross-referencing the second gesture with the database to determine whether the second gesture indicates that the user device should accept the command from the second user.

7. The method of claim 1, further comprising:
    detecting gestures that indicate that the user device should accept the command from the second user from a number of users in the viewing area;
    comparing the number to a threshold number; and
    not authorizing the user device to accept the command from the second user in response to determining that the number does not exceed the threshold number.

8. The method of claim 1, wherein determining whether the first gesture satisfies another criterion comprises:
    determining a length of time of the first gesture; and
    comparing the length of time of the first gesture to a threshold length of time.

9. The method of claim 1, further comprising:
    determining a frequency of the first gesture;
    comparing the frequency to a threshold frequency; and
    not authorizing the user device to accept the command from the second user in response to determining that the frequency does not exceed the threshold frequency.

10. The method of claim 1, wherein the command is a voice command.

11. A system for controlling user devices, the system comprising:
    storage circuitry configured to store a database listing gestures that indicate that user devices should accept commands; and
    control circuitry configured to:
        identify a first user and a second user within a viewing area of a user device;
        detect a first gesture performed by the first user;
        cross-reference the first gesture with the database to determine whether the first gesture indicates that the user device should accept a command from the second user, wherein the cross-referencing comprises:

retrieving a weight associated with the first gesture;

determining whether the weight associated with the first gesture exceeds a value;

in response to determining that the weight associated with the first gesture exceeds the value, determining that the first gesture indicates that the user device should accept the command from the second user; and in response to determining that the weight associated with the first gesture does not exceed the value, determining whether the first gesture satisfies another criterion that indicates the user device should accept the command from the second user; and in response to determining that the first gesture indicates that the user device should accept the command from the second user, authorize the user device to accept the command from the second user.

12. The system of claim 11, wherein the control circuitry is further configured to not authorize the user device to accept the command from the second user in response to determining that the first gesture does not indicate that the user device should accept the command from the second user.

13. The system of claim 11, wherein the control circuitry is further configured to not authorize the user device to accept a different command from the first user in response to determining that the first gesture indicates that the user device should accept the command from the second user.

14. The system of claim 11, wherein determining whether the first gesture indicates that the user device should accept the command from the second user further comprises determining whether the first gesture indicates that the first user is paying attention to the second user.

15. The system of claim 11, wherein the first gesture includes a gaze point of the first user being fixated on the second user.

16. The system of claim 11, wherein the control circuitry is further configured to:

detect a second gesture performed by the second user; and cross-reference the second gesture with the database to determine whether the second gesture indicates that the user device should accept the command from the second user.

17. The system of claim 11, wherein the control circuitry is further configured to:

detect gestures that indicate that the user device should accept the command from the second user from a number of users in the viewing area;

compare the number to a threshold number; and not authorize the user device to accept the command from the second user in response to determining that the number does not exceed the threshold number.

18. The system of claim 11, wherein the control circuitry is further configured to:

determine a length of time of the first gesture; and compare the length of time of the first gesture to a threshold length of time.

19. The system of claim 11, wherein the control circuitry is further configured to:

determine a frequency of the first gesture;

compare the frequency to a threshold frequency; and not authorize the user device to accept the command from the second user in response to determining that the frequency does not exceed the threshold frequency.

20. The system of claim 11, wherein the command is a voice command.

* * * * *